Patented Apr. 25, 1944

2,347,312

UNITED STATES PATENT OFFICE 2,347,312

METHOD OF PRODUCING TRIMETHYLOLNITROMETHANE

Richard F. B. Cox, Wilmington, Del., assignor to Hercules Powder Company, Wilmington, Del., a corporation of Delaware No Drawing. Application October 25, 1939, Serial No. 301,235

3 Claims. (Cl. 260—635)

This invention relates to a method of producing trimethylolnitromethane and more particularly relates to a method of reacting nitromethane and formaldehyde in an organic solvent medium to produce trimethylolnitromethane.

Trimethylolnitromethane is a solid alcohol prepared by the condensation of nitromethane with formaldehyde. It was first prepared by L. Henry in 1895 (Compt. rend 121, 210). In all known processes in which the reaction has been carried out in organic solvents the removal of the reaction product has been accompanied by several difficulties. Because of its great solubility in most solvents, it has been necessary to evaporate the solvent entirely or nearly entirely before the trimethylolnitromethane could be isolated. As is well known, considerable decomposition occurs during the evaporation step due to the heating necessary so that the product obtained has been contaminated with decomposition products and has been discolored. The formation of color bodies, usually consisting of tars produced by side-reactions and polymerization of formaldehyde, seriously contaminates the trimethylolnitromethane and must be removed. Their removal is difficult. Formation of color bodies also reduces the yield of trimethylolnitromethane.

It is an object of this invention to provide a method of producing trimethylolnitromethane in an organic solvent medium which eliminates the step of evaporating the solvent to isolate the trimethylolnitromethane.

Another object of the invention is to provide a method of producing trimethylolnitromethane which avoids the formation of a large proportion of the color bodies formed in the prior art methods.

A further object of the invention is to provide an improved process for producing trimethylolnitromethane of high quality and in high yield.

Other objects of the invention will appear hereinafter.

I have discovered that I may accomplish these objects by carrying out the reaction of nitromethane and formaldehyde in an organic solvent for trimethylolnitromethane, the amount of such solvent being sufficient to dissolve the trimethylolnitromethane formed in the reaction at a temperature of about 50° C. but insufficient to dissolve the trimethylolnitromethane at a temperature of about 5° C. The trimethylolnitromethane may then be recovered directly from the reaction mixture by cooling without intermediate evaporation of the solution. After removing the separated crystals I use the mother liquor for a subsequent condensation.

The nitromethane for use in this invention should be substantially free of other nitroparaffins or of aldehydes and ketones. The products obtained by direct nitration of methane or by the reaction of an alkali nitrite with a methyl halide, methyl hydrogen sulfate, dimethyl sulfate or a salt of chloroacetic acid have been found to be satisfactory.

The formaldehyde is used preferably in the form of paraformaldehyde but may be used in any other desirable form, such as a solution of formaldehyde in an organic solvent. The paraformaldehyde may be in a moist form containing up to about 10 per cent by weight of water, as small amounts of water do not interfere in the crystallization procedure.

A catalyst will be desirable in the reaction and preferably an alkaline catalyst will be employed. The following types of materials or combinations thereof may be used, for example, alkali metal carbonates, bicarbonates or hydroxides, alkaline earth metal hydroxides, salts of dimethylolnitromethane, and equivalents thereof. The amount of catalyst employed in the reaction mixture is an amount which is sufficient to render the mixture slightly alkaline, for example, to litmus paper. An excess of alkaline catalyst over this amount is not desirable since such excess reacts with the nitrohydroxy compounds formed in the reaction with formation of salts thereof.

The proportion of formaldehyde to nitromethane used is preferably within a molecular ratio of about 2.75 to about 3.25 moles of formaldehyde for each mole of nitromethane. Within this range, formation of trimethylolnitromethane is favored over nitroethanol and dimethylolnitromethane. More preferably, the theoretical ratio of 3 moles of formaldehyde to one mole of nitromethane will be used.

A reaction temperature within the range of about 30° C. to about 80° C. may be employed to provide efficient reaction. At the lower temperatures the reaction is quite slow, while at the higher temperatures the reaction is sufficiently rapid without appreciable formation of color bodies. Preferably a temperature within the range of about 50° C. to about 60° C. is used. The reaction temperature employed will depend in part on the boiling point of the solvent employed. The reaction time employed will depend on such factors as the temperatures, solvents and catalysts employed. Generally speaking, a reaction time up to about one hour is contemplated.

Organic solvents which I have found to be useful in my invention are those solvents or mixtures of solvents which are normally considered to be crystallization solvents for trimethylolnitromethane. Such solvents are, for example, ethyl acetate, methyl alcohol, ethyl alcohol, isopropyl alcohol, butyl alcohol, amyl alcohol, hexyl alcohol, mixtures of solvents such as methyl alcohol-ethylene dichloride, isopropyl alcohol-benzene, ethyl acetate-hexane, ethyl acetate-chloroform, butyl alcohol-toluene, etc. With the better solvents for trimethylolnitromethane, for example, methyl alcohol, ethyl alcohol, ethyl acetate, etc., a smaller amount of solvent is used than with the poorer solvents, as for example, butyl alcohol. In any event, the amount of solvent employed is such as to permit crystallization of appreciable amounts of the trimethylolnitromethane from the reaction solution merely by cooling. Organic solvents which are reactive chemically with the reaction ingredients or products are not contemplated within the scope of the invention.

The trimethylolnitromethane prepared in accordance with this invention may, if desired, be further purified by recrystallization from organic solvents. Organic solvents such as ethyl alcohol, ether, ethyl acetate or mixtures of ethyl acetate and chloroform are very satisfactory for the recrystallization.

The following examples illustrate the invention:

Example I

To a solution of 366 parts by weight of nitromethane dissolved in 400 parts by weight of methyl alcohol, 590 parts by weight of paraformaldehyde were added. Then 0.4 part by weight of sodium hydroxide dissolved in one part of water was added and the solution heated to 60° C. and held at about 60° C. until all the paraformaldehyde had dissolved. As the reaction progressed it was necessary to cool the reaction mixture to maintain the above temperature due to the heat liberated in the reaction. The solution was then filtered hot and cooled to about 5° C., whereupon 337 parts by weight of crystalline trimethylolnitromethane separated. The crystalline product was removed by filtration.

Example II

To a suspension of 300 parts by weight of paraformaldehyde in 390 parts by weight of anhydrous ethyl alcohol containing 0.3 part by weight of sodium hydroxide were added 183 parts by weight of nitromethane in small portions while maintaining the temperature of the alcohol solution at about 60° C. After no more heat due to reaction was evolved, the hot solution was treated with 5 parts by weight of decolorizing carbon and filtered hot. The solution was then cooled to about 20° C., whereupon a large yield of crystals of trimethylolnitromethane separated. The crystals were removed in a centrifuge and dried for 15 hours at 50° C. in a current of air. The dried product was very light in color.

To the mother liquor resulting after removal of the crystals 150 parts by weight of paraformaldehyde, 95 parts by weight of nitromethane and 0.3 part by weight of sodium hydroxide in 25 parts by weight of alcohol were added. The reaction was again carried out at a temperature of 60° C. until condensation was complete, the solution treated with decolorizing carbon as before and cooled to 20° C. The crystals which separated were removed in a centrifuge. The trimethylolnitromethane crystals were dried as before. The mother liquor resulting from the second reaction was then used in a subsequent reaction.

Example III

Condensation of 273 parts by weight of paraformaldehyde with 183 parts by weight of nitromethane was effected in 230 parts by weight of ethyl acetate containing 0.3 part by weight of potassium hydroxide in 8 parts by weight of methyl alcohol by heating the mixture to about 60° C. and maintaining at about 60° C. until the paraformaldehyde had dissolved. The solution was then filtered and cooled to crystallize. The yield of crystalline trimethylolnitromethane obtained was 337 parts by weight.

Example IV

Condensation of 273 parts by weight of paraformaldehyde with 183 parts by weight of nitromethane was carried out in 300 parts by weight of butyl alcohol containing 0.3 part by weight of potassium hydroxide dissolved in 4 parts by weight of ethyl alcohol. Reaction was carried out by heating the mixture to a temperature of about 60° C. and maintaining the mixture at about 60° C. for one hour. The solution was then cooled to crystallize the trimethylolnitromethane formed in the reaction. The yield of crystals in the first crystallization was 282 parts by weight. To the mother liquor 273 parts by weight of paraformaldehyde, 100 parts by weight of butyl alcohol, 183 parts by weight of nitromethane and 0.3 part by weight of potassium hydroxide dissolved in 4 parts by weight of ethyl alcohol were added. Then reaction was carried out as before. On cooling, a yield of 369 parts by weight of trimethylolnitromethane was obtained. The second mother liquor could be used in another reaction.

Example V

Condensation of 305 parts by weight of nitromethane with 454 parts by weight of paraformaldehyde was carried out in 200 parts by weight of butyl alcohol containing 0.8 part by weight of a 40% aqueous solution of sodium hydroxide. The reaction was brought about by heating and maintaining the mixture at a temperature of about 60–75° C. for about 20 minutes. The reaction solution was filtered hot and cooled to crystallize. The yield of crystalline trimethylolnitromethane in one crystallization was 524 parts by weight.

The method of producing trimethylolnitromethane in accordance with this invention eliminates the step of evaporating the solvent to recover the trimethylolnitromethane which has always been necessary in the prior art procedures. It is well known that the concentration step hitherto necessary gives rise to a large amount of color body formation. My process, by eliminating the concentration or evaporation step, also eliminates such color body formation. The product which I obtain directly by crystallization from the reaction solution is relatively free from colored impurities.

In the above description and in the appended claims the term "nitromethane" is understood to designate "mono-nitromethane."

It will be understood that the details and examples hereinbefore set forth are illustrative only and that the invention as herein broadly described and claimed is in no way limited thereby.

What I claim and desire to protect by Letters Patent is:

1. The process for the preparation of trimethylolnitromethane which comprises condensing mononitromethane with formaldehyde in an alkaline medium comprising a monohydric aliphatic alcohol containing from four to six carbon atoms.

2. The process for the preparation of trimethylolnitromethane which comprises condensing mononitromethane with formaldehyde in an alkaline medium comprising normal butyl alcohol.

3. The process for the preparation of trimethylolnitromethane which comprises condensing mononitromethane with formaldehyde in an alkaline medium comprising normal butyl alcohol, said mononitromethane and formaldehyde being present in the alkaline medium in the molecular proportions of one to three.

RICHARD F. B. COX.